(12) United States Patent
Beselt

(10) Patent No.: US 6,356,811 B1
(45) Date of Patent: Mar. 12, 2002

(54) CONTROL SYSTEM FOR PNEUMATIC ACTUATORS

(75) Inventor: Ronald E. Beselt, Burnaby (CA)

(73) Assignee: Honeywell Measurex Devron Inc., North Vancouver (CA)

( * ) Notice: Subject to any disclaimer, the term of this patent is extended or adjusted under 35 U.S.C. 154(b) by 0 days.

(21) Appl. No.: 09/170,982

(22) Filed: Oct. 13, 1998

(51) Int. Cl.$^7$ .................................. G05D 16/00
(52) U.S. Cl. ............... 700/301; 700/13; 700/19; 700/282
(58) Field of Search .................. 700/301, 9, 11, 700/12, 13, 14, 19, 21, 282, 306, 56, 70; 701/49, 70; 702/33, 150; 303/20, 127, 128; 91/361; 236/49.3

(56) References Cited

U.S. PATENT DOCUMENTS

| | | | | |
|---|---|---|---|---|
| 4,261,509 A | * | 4/1981 | Anders et al. | 236/49.3 |
| 4,344,138 A | * | 8/1982 | Frasier | 701/70 |
| 4,538,228 A | * | 8/1985 | Brearey et al. | 701/70 |
| 4,741,247 A | * | 5/1988 | Glomeau et al. | 91/361 |
| 6,098,000 A | * | 8/2000 | Long et al. | 701/49 |

* cited by examiner

Primary Examiner—William Grant
Assistant Examiner—Steven R. Garland
(74) Attorney, Agent, or Firm—Christie, Parker & Hale, LLP

(57) ABSTRACT

A method and apparatus for controlling the state of a pneumatic actuator having a valve that connects the actuator to a supply pressure and a valve that connects the actuator to an exhaust pressure. The method involves closing the supply pressure and exhaust pressure valves, determining the current state of the pneumatic actuator, and then determining the difference between the current state and a desired state. The appropriate pressure valve to be opened and the period to be opened is then calculated based on predetermined calibration data for the actuator which permits the end state of the actuator to be predicted. The appropriate valve is then opened for the calculated period to adjust the actuator to the desired state. The process is then repeated until the current state of the actuator is the desired state. A controller unit that uses the above method is also disclosed. Equipment incorporating the method and apparatus of the present invention enjoys significantly reduced manufacturing and installation costs. The size of the components and the assembly time for the equipment is also reduced. The design allows for flexibility with regard to various pneumatic actuator types. The system can handle different sources of state feedback such as pressure or position without major changes to hardware. In addition, feedback of the pneumatic actuator state allows for diagnosis of the system with timely scheduling of necessary maintenance. Deterioration of pneumatic actuators is detected and can be compensated for to maintain full operation of the system.

12 Claims, 8 Drawing Sheets

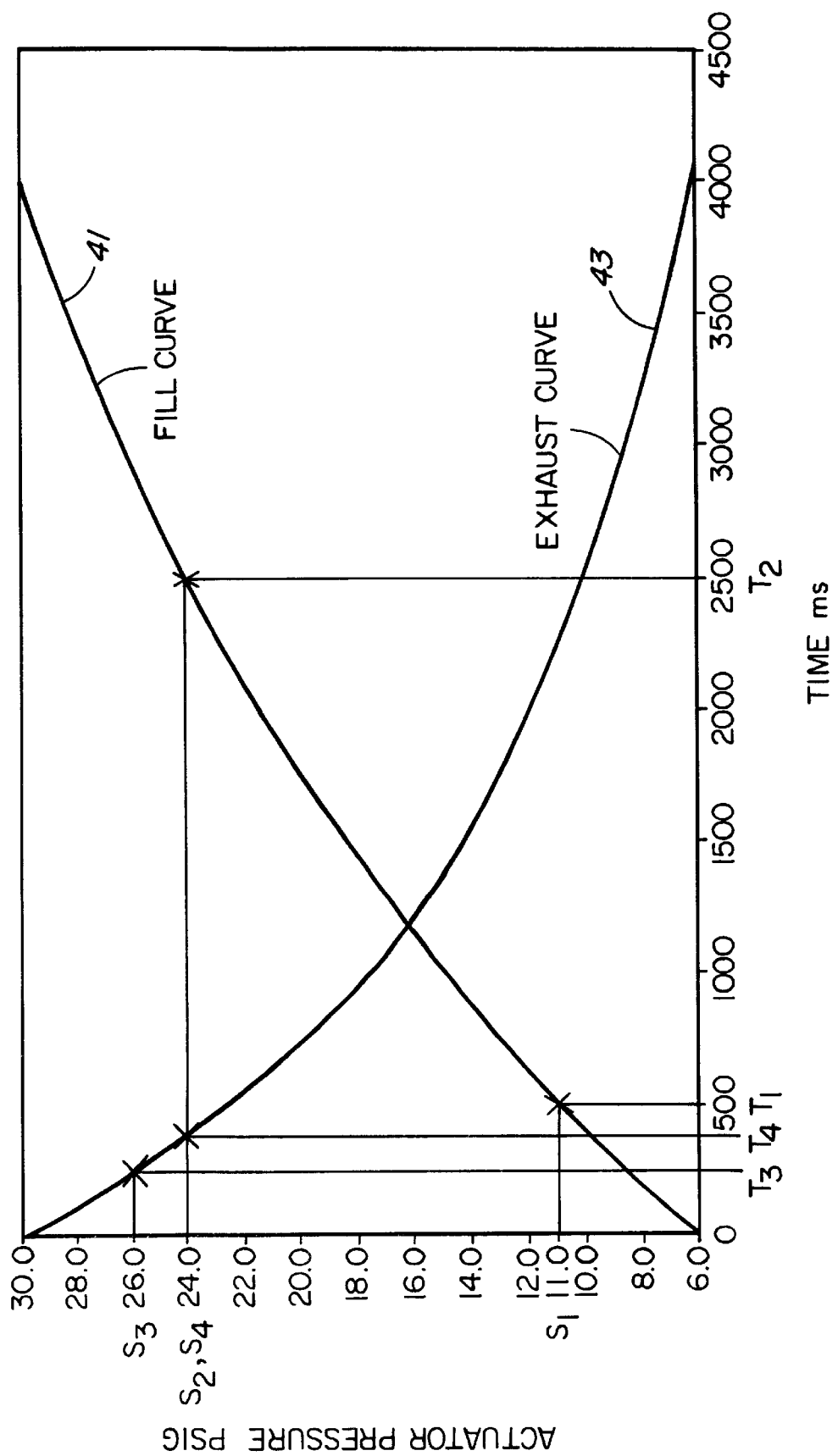

CONTROL SYSTEM FOR PNEUMATIC ACTUATORS

FIELD OF THE INVENTION

This invention relates to a control system for use with pneumatic actuators.

BACKGROUND OF THE INVENTION

Conventional papermaking machinery for producing a continuous sheet of paper includes equipment to set the sheet properties of the paper as it is being manufactured. Generally, on-line measurements of sheet properties, such as thickness, gloss or smoothness are made by scanning sensors that travels back and forth across the width of the sheet of paper in the cross-machine direction (CD). The scanning sensors are located downstream of actuators that are controlled to adjust the sheet properties. The scanning sensors collect information about the sheet properties to develop a property profile across the sheet and provide control signals to the appropriate actuators to adjust the profile toward a desired target profile in a feedback loop. In practice, the actuators provide generally independent adjustment at adjacent cross-directional locations of the sheet, normally referred to as slices.

The actuators used in sheetmaking machinery rely on various power sources for carrying out adjustments of the actuator. Such power sources often include electric motors or hydraulic or pneumatic lines that are operated to achieved the desired control movements of the actuator. The apparatus and method of the present invention is concerned with a novel control scheme for use with actuators that rely on a source of pneumatic pressure for operation.

For example, actuators controlled by pneumatic pressure are used in steam showers that apply steam to a paper sheet passing beneath. The application of steam is used to increase the temperature of the sheet to facilitate the removal of the water from the sheet, that is to facilitate its drying to form the paper, principally by decreasing the viscosity of the water in the sheet to facilitate drainage. The steam shower is also used to improve and control the mixture and other sheet property profiles of the web by the addition of heat and water.

SUMMARY OF THE INVENTION

Applicant has developed a novel apparatus and method for control of actuators and actuator components that rely on pneumatic pressure for operation. This control scheme is based on the observation that by subjecting a component with a known starting state to a supply or exhaust pressure for a specified period, it is possible to predict the end state of the component to within an acceptable error.

Accordingly, the present invention provides a method for controlling the state of a pneumatic actuator having a valve that connects the actuator to a supply pressure and a valve that connects the actuator to an exhaust pressure, comprising the steps of:
a) closing the supply pressure and exhaust pressure valves;
b) determining the current state of the pneumatic actuator;
c) determining the difference between the current state and a desired state;
d) calculating the appropriate pressure valve to be opened and the period to be opened based on pre-determined calibration data for the actuator which permit the end state of the actuator to be predicted;
e) opening the appropriate valve for the calculated period to adjust the actuator to the desired state; and
f) repeating steps a) to e) until the current state is the desired state.

In a further aspect, the present invention provides a control unit for controlling the state of a pneumatic actuator comprising:
a valve connectable between a supply pressure and the actuator and a valve connectable between an exhaust pressure and the actuator;
a sensor to determine the state of the actuator; and
a microcontroller in communication with the sensor and the valves for determining the difference between the current state and a desired state and for storing pre-determined calibration data for the actuator whereby the calibration data allows the microcontroller to calculate the appropriate pressure valve to be opened and the period of opening so that the state of the actuator can be adjusted from the current state to the desired state.

Equipment incorporating the method and apparatus of the present invention enjoys significantly reduced manufacturing and installation costs. The size of the components and the assembly time for the equipment is also reduced. The design allows for flexibility with regard to various pneumatic component types. The system can handle different sources of feedback relating to the state of the pneumatic actuators without major changes to hardware. For example, the state of the actuators can be monitored by detecting the internal pressure of the actuator or the position of the valve portion of the actuator. In addition, feedback of the pneumatic actuator state allows for diagnosis of the system with timely scheduling of necessary maintenance. Deterioration of pneumatic components is detected and can be compensated for to maintain full operation of the system.

BRIEF DESCRIPTION OF THE DRAWINGS

Aspects of the present invention are illustrated, merely by way of example, in the accompanying drawings in which:

FIG. 4 shows typical actuator time/pressure curves that are used to predict the behaviour of the actuators;

DESCRIPTION OF THE PREFERRED EMBODIMENTS

Figure 1:
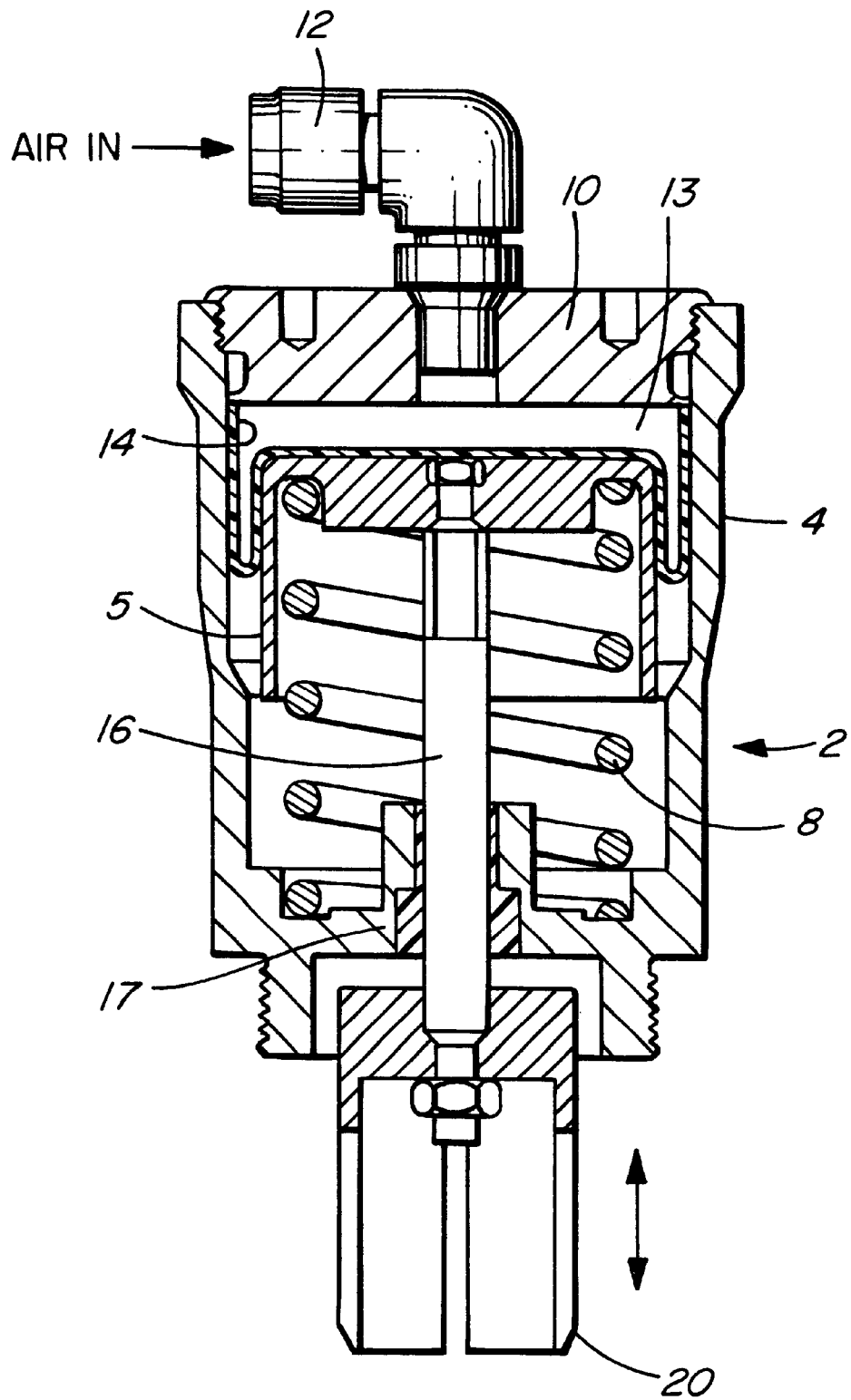
FIG. 1 is a section view through a typical pneumatic actuator controllable through the method and apparatus of the present invention by sensing the internal pressure of the actuator.

Referring to FIG. 1, there is shown a typical pneumatic actuator 2 for use in the steam shower of a papermaking machine and which is controllable by the novel method and apparatus of the present invention. Pneumatic actuator 2 is described and illustrated merely by way of example, and the method and apparatus of the present invention is not intended to be limited to use with such as actuator.

Figure 2:
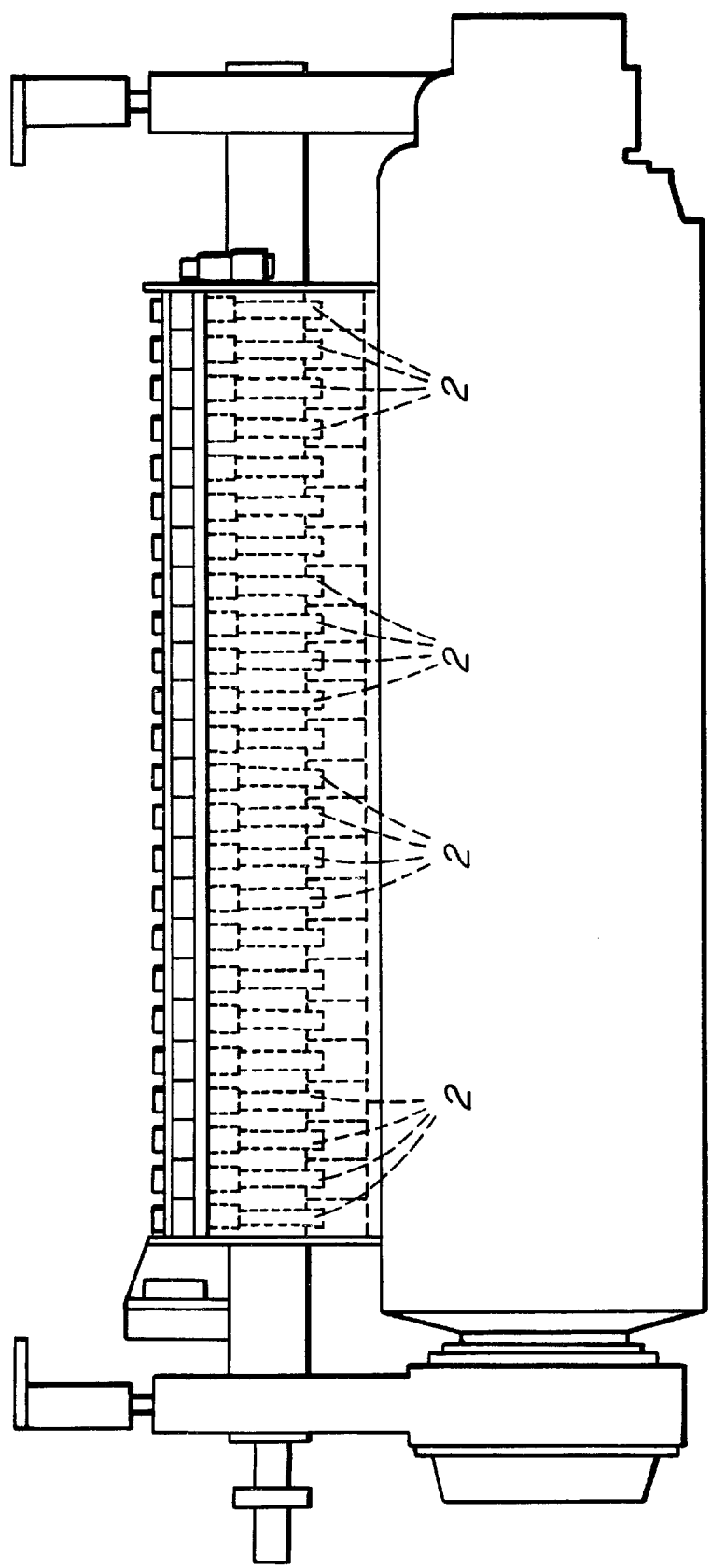
FIG. 2 is a plan view in the cross-machine direction of a typical steam shower showing the arrangement of the pneumatic actuators of FIG. 1.

Actuate or 2 comprises a sealed cylinder 4 having an internal piston 5 that is normally biased upwardly to a default position adjacent cylinder head 10 by internal spring 8. An inlet port 12 in head 10 communicates a pressure supply (not shown) with the upper interior region 13 of cylinder 4. A flexible diaphragm 14 forms a seal between piston 5 and cylinder 10. Extending downwardly from piston 5 and out through base 17 of cylinder 5 is a valve stem 16 which is connected to valve plug 20. Valve plug 20 moves with piston 5 to control the amount of steam delivered from an aperture in a steam manifold (not shown). Each actuator controls delivery of steam to a specific region of a paper sheet passing through the steam shower. FIG. 2 is a plan view of the steam shower in the cross-machine direction showing a series of pneumatic actuators 2 extending across the steam shower. Each of the actuators shown is controlled independently to establish a desired profile across the web of paper under manufacture.

The position of internal piston 5 and hence the position of valve plug 20 is controlled by controlling the pressure supply to port 12 and the internal pressure within region 13 of the actuator. Once the pressure is increased sufficiently to generate a downward force on piston 5 greater than the upward force of spring 8, piston 5 moves downwardly with a resulting downward movement of valve plug 20.

Conventional methods for controlling the actuators involve manually adjusted pressure regulators or electrically controlled current to pressure devices (I/P converters). Applicant has,developed a novel control unit and method for controlling the actuators 2 of the steam shower or any pneumatic pressure component.

Figure 3A:
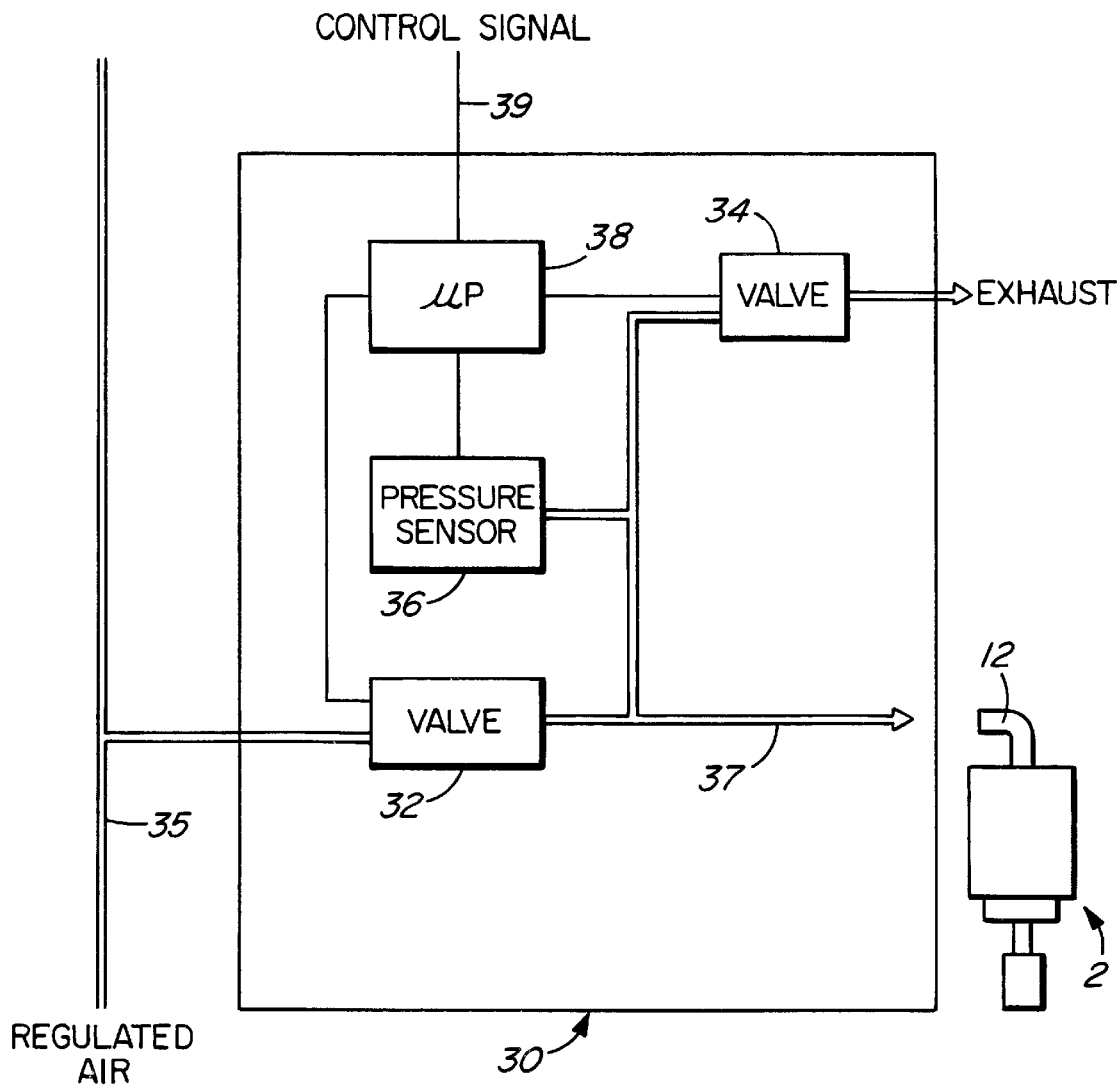
FIG. 3a is a schematic view of a control unit according to the present invention for controlling a single pneumatic actuator.

Referring to FIG. 3a, there is shown a schematic diagram of a control unit 30 according to the present invention for controlling the state of pneumatic actuator 2. The control unit comprises a first supply pressure valve 32 connectable between actuator 2 and a supply of regulated air provided by line 35. There is also a second exhaust valve 34 connectable between an exhaust pressure and actuator 2. Valves 32 and 34 are connected by common line 37 to inlet port 12 of actuator 2. A pressure sensor 36 is provided to monitor the state of the actuator by determining the internal pressure of the actuator. A microcontroller 38 communicates with pressure sensor 36 and valves 32 and 34. Microcontroller 38 acts to adjust the current state of the actuator to a desired state. In the present embodiment, the state of the actuator is the internal pressure of the actuator within region 13. The desired state of the actuator is determined by a conventional feedback control loop from the downstream scanning sensors. The control signal from the feedback loop is communicated to microprocessor 38 by signal line 39.

Microcontroller 38 also stores a pre-determined time/pressure relationship for actuator 2. An example of such a time/pressure relationship is shown in FIG. 4 which shows a graph of time vs. actuator pressure. The graph includes a fill curve 41 and an exhaust curve 43. The points on fill curve 41 indicate the time that supply pressure valve 32 must be open for the actuator to increase to a given internal pressure. Similarly, the points on exhaust curve 43 indicate the time that exhaust valve 34 must be open for the actuator to decrease to a given internal pressure. Data defining the time/pressure relationship for each output can be automatically generated by a calibration routine performed by the microcontroller using pressure sensor 36 and supply pressure valve 32 and exhaust valve 34. The calibration data is preferably stored in an array in microprocessor 38. A separate array for each actuator 2 under the control of the microprocessor 38 is necessary. Data points that fall between the array values are determined using linear interpolation techniques. Based on the time/pressure relationship stored by the microcontroller 38, the microcontroller calculates the appropriate pressure valve to be opened and the period to be opened in order to adjust the state of the actuator from its current state to the desired state.

Referring to FIG. 4, an example of the manner in which microcontroller operates the valves will be described. As a starting point, the actuator is at an initial state $S_1$ with an internal pressure of 11 psig as detected by pressure sensor 36. Based on scanned property information from downstream scanning sensors, assume a control signal from the conventional feedback control loop is received by microprocessor 38 calling for the desired state $S_2$ of the actuator to be 24 psig. Referring to the time/pressure relationship, microprocessor 38 determines that in order to increase the internal pressure of actuator 2 from the current state $S^1$ of 11 psig to the desired state $S_2$ of 24 psig, supply pressure valve 32 must be opened for a period of 2000 ms ($T_2-T_1$= 2500–500 ms).

If in the foregoing example, it is determined by pressure sensor 36 that the internal pressure of actuator 2 overshoots to 26 psig rather than 24 psig, then microprocessor 38 can correct this problem by using exhaust curve 43. Exhaust valve 34 must be opened for 170 ms ($T_4-T_3$) to move from state $S_3$ of 26 psig to desired state $S_4$ of 24 psig.

In operation, the control unit 30 of the present invention operates in a control cycle as follows:

At the start of a cycle, microcontroller 38 closes the supply pressure and exhaust pressure valves 32 and 34, respectively, to isolate the actuator to be controlled. Pressure sensor 36 is checked to determine the current state of the actuator. Via line 39, microcontroller 38 receives a signal from the conventional control system that relies on downstream scanner measurements to determine the desired state of the actuator, and then the microcontroller determines the difference between the current state and the desired state of the actuator. Microcontroller 38 calculates the appropriate pressure valve to be opened and the period to be opened based on the stored pre-determined time/pressure relationship for the actuator. This calculation allows the end state of the component to be predicted. The appropriate valve 32 or 34 is opened for the calculated period to adjust the actuator to the desired state. The above steps are then repeated until the current, measured state of the actuator is the desired state.

Figure 3B:
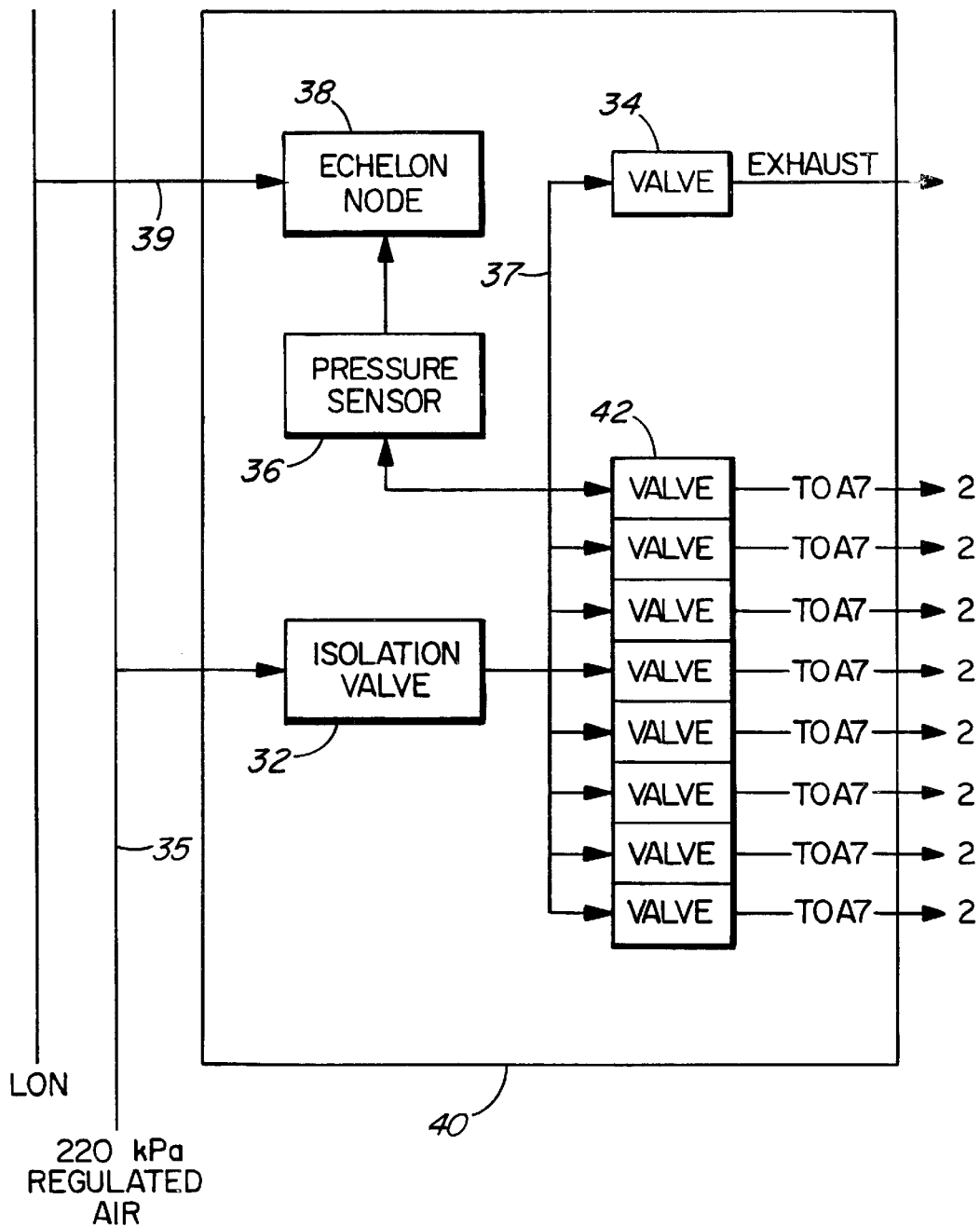
FIG. 3b is a schematic view of a control unit for controlling a plurality of pneumatic actuators.

FIG. 3b illustrates a further embodiment of the control unit of the present invention intended for controlling multiple actuators. The control unit 40 is substantially the same as for the single control unit described above. Valve 32 communicates with the pressure supply line 35 and valve 34 communicates with exhaust pressure. A multiplexing valve array 42 is provided for connecting each actuator 2 independently to pressure valve 32 and 34. In operation, the multiplexing valve array 42, and the supply and exhaust pressure valves 32 and 34, respectively, are closed to start a control cycle. A multiplexing valve 42 is activated to communicate a selected one of the pneumatic actuators 2 to the supply pressure and the exhaust pressure valves, and then the control cycle is identical to that described above for the single controller. Once a selected actuator has been adjusted to the desired state, the multiplexing valves are operated to select the next actuator to be controlled and the steps repeated for each of the actuators controlled by control unit 40.

The control units of the present invention are connected together via a local operating network (LON) defined by control lines 39 in order to communicate with the conventional control system. Each microprocessor 38 is assigned a unique address on the network to distinguish between different control units.

Figure 5A:
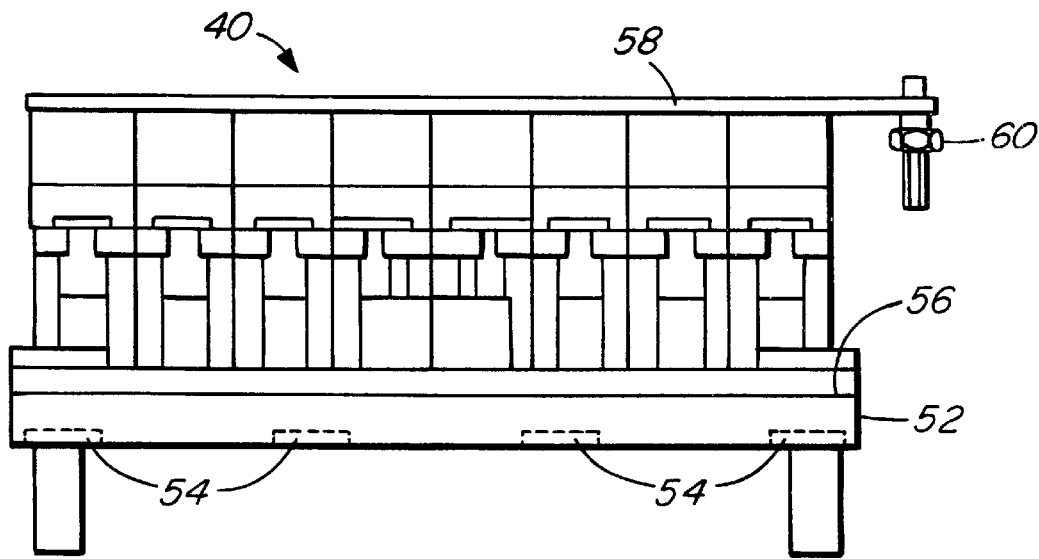
FIGS. 5a and 5b are side and end elevation views of a typical control unit illustrated schematically in FIG. 3.
Figure 5B:
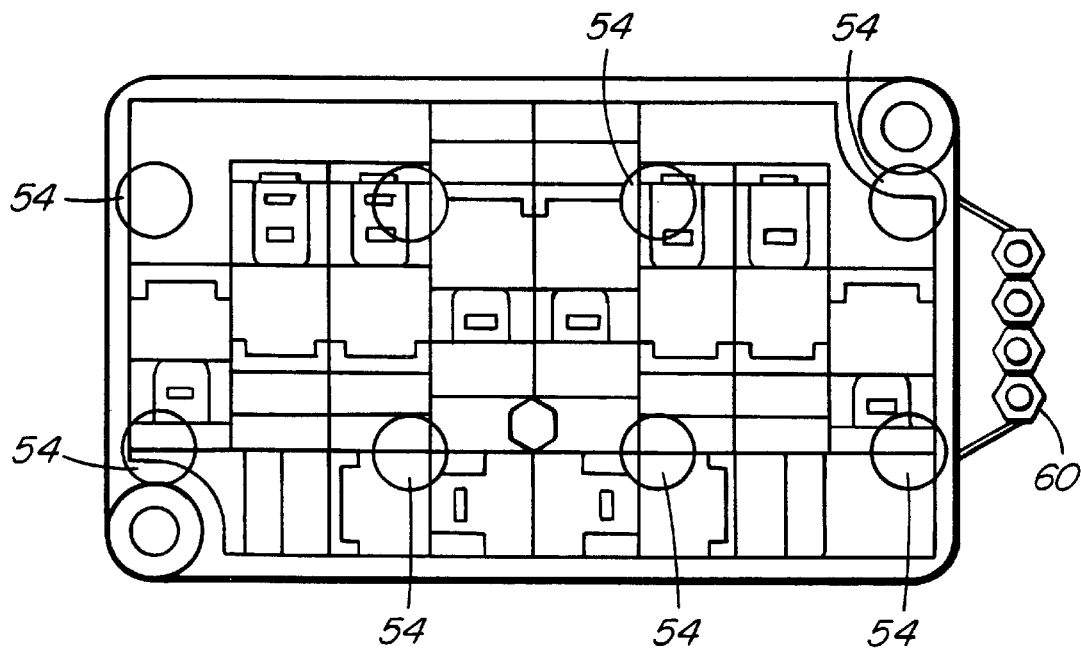

FIGS. 5a and 5b are side and end elevation views, respectively, of an actual control unit 40. Base plate 52 includes eight ports 54 for connection to the inlets of up to eight actuators. A manifold plate 56 is formed with appropriate channels to define the passages communicating the various valve and pressure sensor components of the unit. The various supply, exhaust and multiplexing valves are mounted to manifold plate 56. Preferably, the valves are two-way solenoid valves that can be controlled by microcontroller 38. A printed circuit board (PCB) 58 is mounted atop the valves which includes microcontroller 38 and the circuitry needed to control the valves. PCBs 58 preferably include circuitry to alert microcontroller 38 in case of electrical failure of the valves or pressure sensor. PCB 58 includes contacts 60 for connection to an appropriate power source and for connection to communications line 39 that transmits control signals to the unit. The control unit of the present invention provides a relatively small and compact unit.

Figure 6A:
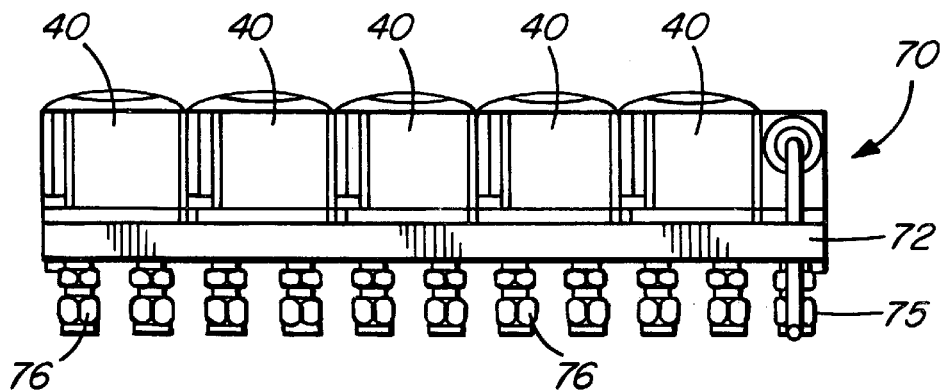
FIGS. 6a and 6b are side and end elevation views, respectively, of control modules incorporating several control units.
Figure 6B:
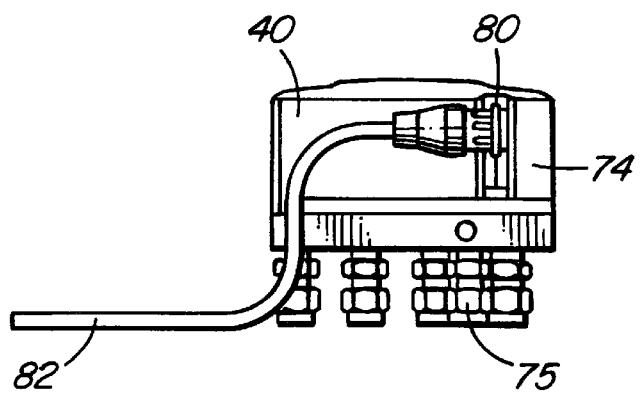

Individual control units 40 can be further combined to form control modules 70 as shown in side and end elevation views in FIGS. 6a and 6b, respectively. Each control unit 40 is preferably "potted" or encapsulated with epoxy or another suitable substance to seal out contaminants and mounted to plate 72. Plate 72 is preferably formed with an air supply manifold. An air supply port 75 provides a convenient single connection to communicate the supply pressure via line 35 (see FIGS. 3a and 3b) with the manifold. Ports 54 of each control unit 40 communicate with connectors 76 extending from plate 72. Tubing (not shown) extends between each connector 76 to the actuator to be controlled.

The contacts 60 of each unit 40 plug into power distribution bar 74. Bar 74 includes a releasable connection 80 that connects to a power and communications cable 82. The control module 70 is modular and malfunctioning control units 40 can be easily and efficiently "unplugged" and replaced for quick repairs.

The control units of the present invention can be used to determine problems with the actuators and other associated equipment. The control units run diagnostic and calibration routines that detect and monitor operation of the actuators for maintenance purposes:

1. The control unit of the present invention is able to detect failure of the diaphragm of the actuator by checking for drops in internal actuator pressure over time.

2. By closing all the valves in the control unit except for the supply pressure valve 32, the supply pressure can be checked.

3. A two point calibration of the system can be done to correct for temperature effects. This is achieved by opening only exhaust valve 34 and taking a reading with pressure sensor 36 to obtain a first point. Then a reading of the known constant supply pressure is taken for the second data point.

4. Leakage of inlet valve 32 can be detected by closing all valves, temporarily opening then closing the exhaust valve and then detecting any gradual rise in pressure at pressure sensor 36. Other valves can be checked for proper operation in a similar manner.

5. In the case of control modules 70, the sensor readings of the various individual control units 40 can be compared to detect sensor problems.

Control units 40 for controlling an array of actuators via a multiplexing valve system 42 (see FIG. 3b) are able to adapt to and compensate for detected problems in controlled actuators. If problems are detected in particular actuators, microprocessor 38 is programmed to ignore actuators which are properly functioning and concentrate all diagnostic and control functions of the control unit to the malfunctioning actuators. This is an adaptive type of control scheme. For example, if an actuator has a small air leak, the microprocessor can allocate all resource of the control unit to maintain the setpoint of the malfunctioning actuator so that the sheet property controlled by the actuator will be preserved as best as possible. The other actuators controlled by unit 40 are only checked after expiration of a pre-determined time period or upon receiving a change in the control setpoint from the control feedback system.

The control units discussed to this point, all rely on monitoring the internal pressure of the actuator. The feedback control signal indicates the desired state of the actuator by providing a signal of the desired internal pressure of the actuator, and microprocessor 38 uses a time/pressure relationship for the actuator to adjust the actuator to the desired pressure. It will be readily apparent to those skilled in the art that alternative control schemes are possible.

Figure 7:
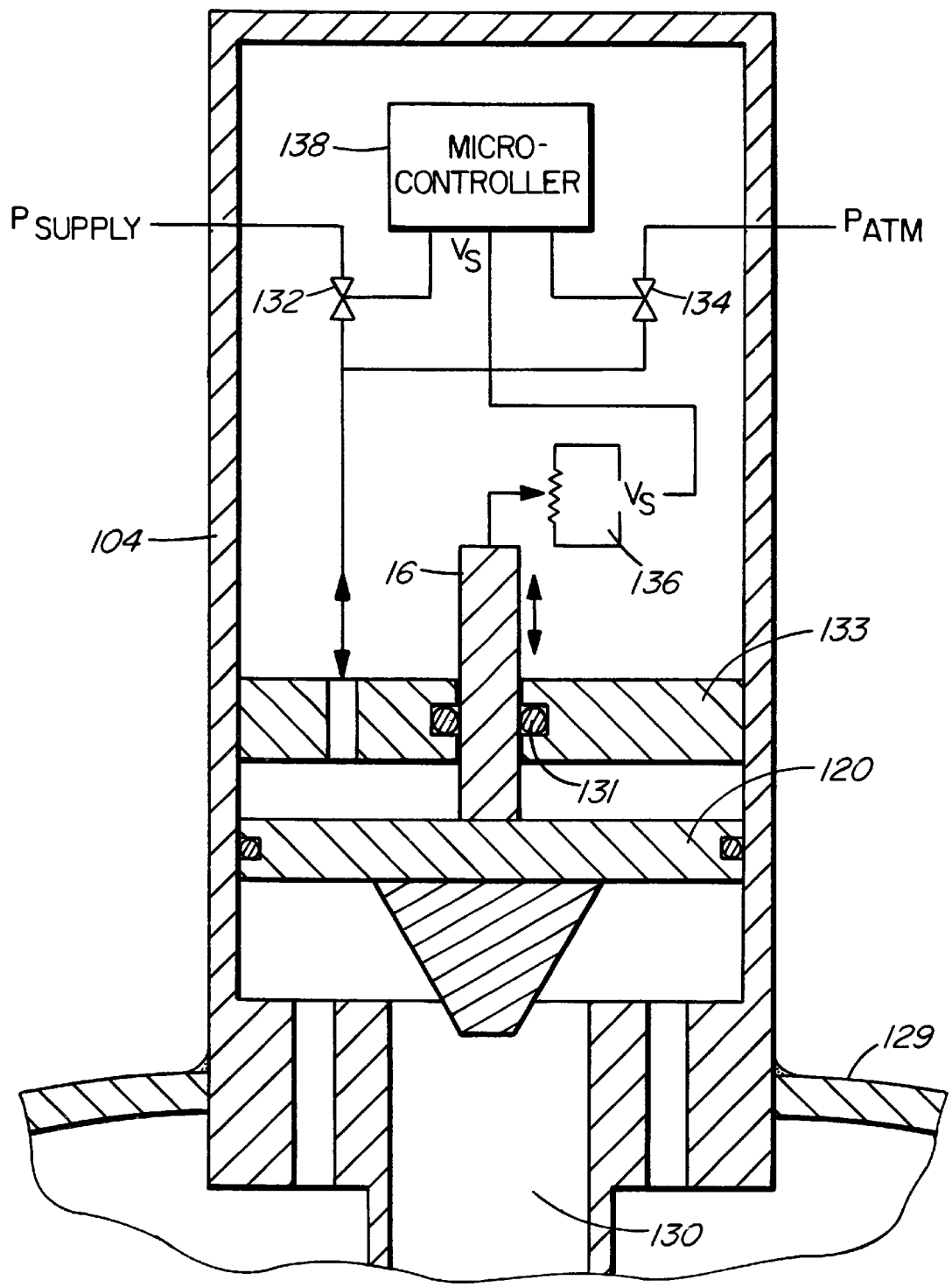
FIG. 7 is a schematic view of an alternative embodiment of the control unit of the present invention that relies on sensing the position of the valve of the actuator.

For example, FIG. 7 shows a pneumatic actuator 2 equipped with a position sensor to monitor the position of the actuator valve that controls the release of steam. In this case, the control feedback signal is a position signal for the actuator valve.

Referring to FIG. 7, there is shown an pneumatic actuator 2 for a steam shower similar to the actuator shown in FIG. 1. A supply of air pressure acts to move valve plug 120 within cylinder 104 to adjust the size of opening of steam port 130 so that the volume of steam exiting steam header 129 via port 130 can be controlled. In this arrangement, the pressure of the steam ($P_{steam}$) provides a return force against the air pressure supply ($P_{supply}$) rather than a spring 8 as illustrated in the actuator of FIG. 1. Both $P_{steam}$ and $P_{supply}$ are greater than atmospheric pressure. Valve plug 120 includes a stem 116 that is sealable and slidably supported in bearing 131 in annular plate 133 extending across cylinder 104. In operation, air pressure above valve plug 120 is varied by operation of supply pressure valve 132 and exhaust valve 134. Valve plug 120 moves to a position such that the steam pressure below the plug and the pressure above the plug in the cylinder are equalized.

Figure 8:
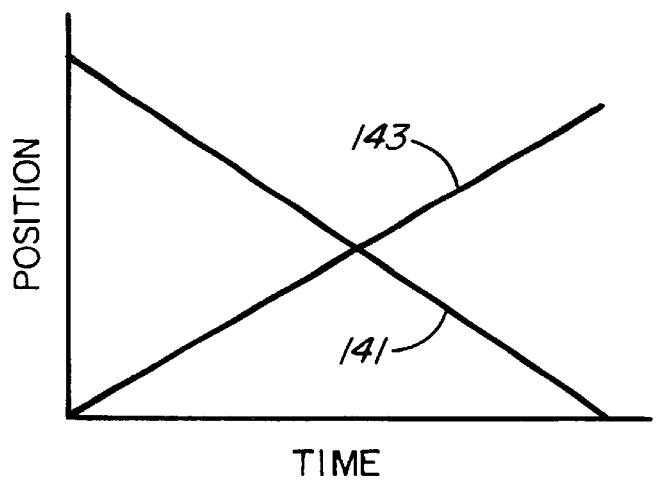
FIG. 8 shows typical actuator time/position curves that are used to predict the behaviour of the actuators shown in FIG. 7.

The position of plug valve 120 is determined by a position sensor 136 that monitors the movement of the end of valve stem 116. The signal from position sensor 136 is communicated to microprocessor 138 which stores pre-determined calibration data for the actuator that provides a time/position relationship for predicting the position of the plug valve after a given period of exposure to the supply or exhaust pressures. FIG. 8 shows examples of time/position curves for an actuator. Curve 141 is a fill curve and curve 143 is an exhaust curve. The points on fill curve 141 indicate the time that supply pressure valve 132 must be open for the actuator to move downwardly to a given position. Similarly, the points on exhaust curve 143 indicate the time that exhaust valve 134 must be open for the actuator to move upwardly to a given position. Data defining the time/pressure relationship for each output can be automatically generated by a calibration routine. The slope of the fill and exhaust curves will be dependent on the pressure of the steam and the pressure of the air supply.

Controlling the actuator of FIG. 7 involves control signals from the conventional feedback system, in the form of actuator position signals, being received by microprocessor 138. On receiving a control signal indicating the desired positional state of the actuator, microprocessor 138 causes the appropriate pressure valve to be opened for an appropriate period as calculated using the time/position curves to adjust the current positional state of the actuator to the desired state.

Although the present invention has been described in some detail by way of example for purposes of clarity and understanding, it will be apparent that certain changes and modifications may be practised within the scope of the appended claims.

I claim:

1. A method for controlling the state of a pneumatic actuator with a movable portion having a valve that connects the actuator to a supply pressure and a valve that connects the actuator to an exhaust pressure, comprising the steps of:
   a) closing the supply pressure and exhaust pressure valves;
   b) determining the current state of the pneumatic actuator;
   c) determining the difference between the current state and a desired state;
   d) calculating the appropriate pressure valve to be opened and the period to be opened based on pre-determined calibration data for the actuator which permit the end state of the actuator to be predicted, the calibration data being based on time and the position of the movable portion of the actuator to provide a time/position relationship for predicting the position of the movable portion after a given period of exposure to the supply or exhaust pressures;
   e) opening the appropriate valve for the calculated period to adjust the actuator to the desired state; and
   f) repeating steps a) to e) until the current state is the desired state.

2. A method as claimed in claim 1 including the additional steps of:
   detecting and monitoring deviations from the calibration data for the actuator; and
   diagnosing deterioration or failure of the actuator based on the detected deviations.

3. A method as claimed in claim 1 in which the step of determining the current state of the actuator involves measuring the position of the movable portion of the actuator.

4. A method as claimed in claim 1 in which the step of calculating the appropriate pressure valve to be opened and the period to be opened is performed in a microprocessor that stores the time/position relationship for the actuator.

5. A method for controlling the states of an array of pneumatic actuators having a multiplexing valve for connecting each actuator independently to a supply pressure valve and an exhaust pressure valve comprising the steps of:
   a) closing the multiplexing valve and the supply pressure and exhaust pressure valves;
   b) opening the multiplexing valve to communicate a selected one of the pneumatic actuators to the supply pressure and the exhaust pressure valves;
   c) determining the current state of the selected pneumatic actuator;
   d) determining the difference between the current state and a desired state;
   e) calculating the appropriate pressure valve to be opened and the period to be opened based on pre-determined calibration data for the selected one of the pneumatic actuators which permit the end state of the actuator to be predicted, the pre-determined calibration data of the actuators being based on time and pressure to provide a time/pressure relationship for predicting the internal pressure of the actuators after a given period of exposure to the supply or exhaust pressures, the calculation being performed in a microprocessor that stores the time/pressure relationships for each of the actuators of the array;
   f) opening the appropriate pressure valve for the calculated period to adjust the selected one of the actuators to the desired state;
   g) repeating steps c) to f) until the current state is the desired state; and
   h) repeating steps a) to g) for each of the pneumatic actuators of the array.

6. A method as claimed in claim 5 in which the step of determining the current state of the selected one of the actuators involves measuring the internal pressure of the actuator.

7. A method for controlling the states of an array of pneumatic actuators having a multiplexing valve for connecting each actuator independently to a supply pressure valve and an exhaust pressure valve, and in which each of the actuators includes a movable portion, comprising the steps of:
   a) closing the multiplexing valve and the supply pressure and exhaust pressure valves;
   b) opening the multiplexing valve to communicate a selected one of the pneumatic actuators to the supply pressure and the exhaust pressure valves;
   c) determining the current state of the selected pneumatic actuator;
   d) determining the difference between the current state and a desired state;
   e) calculating the appropriate pressure valve to be opened and the period to be opened based on pre-determined calibration data for the selected one of the pneumatic actuators which permit the end state of the actuator to be predicted, the pre-determined calibration data for each of the actuators being based on time and the position of the movable portion of the actuator to provide a time/position relationship for predicting the position of the movable portion after a given period of exposure to the supply or exhaust pressures;
   f) opening the appropriate pressure valve for the calculated period to adjust the selected one of the actuators to the desired state;
   g) repeating steps c) to f) until the current state is the desired state; and
   h) repeating steps a) to g) for each of the pneumatic actuators of the array.

8. A method as claimed in claim 7 in which the step of determining the current state of the actuator involves measuring the position of the movable portion of the actuator.

9. A method as claimed in claim 7 in which the step of calculating the appropriate pressure valve to be opened and the period to be opened is performed in a microprocessor that stores the time/position relationship for the actuator.

10. A control unit for controlling the state of a pneumatic actuator having a movable portion comprising:

a valve connectable between a supply pressure and the actuator and a valve connectable between an exhaust pressure and the actuator;

a sensor to determine the state of the actuator; and a microcontroller in communication with the sensor and the valves for determining the difference between the current state and a desired state and storing predetermined calibration data for the actuator based on time and position of the movable portion of the actuator and provides a time/position relationship for predicting the position of the movable portion after a given period of exposure to the supply or exhaust pressures whereby the calibration data allows the microcontroller to calculate the appropriate pressure valve to be opened and the period of opening so that the state of the actuator can be adjusted from the current state to the desired state.

11. A control unit as claimed in claim 10 for controlling a plurality of pneumatic actuators including a multiplexing valve for connecting each actuator independently to one of the supply pressure valve and the exhaust pressure valve.

12. A control unit as claimed in claim 10 in which the sensor detects the position of the movable portion of the actuator.

\* \* \* \* \*